United States Patent [19]

Beyzavi et al.

[11] Patent Number: 5,482,535
[45] Date of Patent: Jan. 9, 1996

[54] PROCESS FOR THE RECOVERY OF SILVER BY FLOATATION FROM THE RESIDUE FROM THE WET EXTRACTION OF ZINC

[75] Inventors: Ali-Nagi Beyzavi, Frankfurt; Horst Dittmann, Büdingen; Friedrich Rosenstock, Frankfurt, all of Germany

[73] Assignee: Metallgesellschaft Aktiengesellschaft, Frankfurt am Main, Germany

[21] Appl. No.: 274,200

[22] Filed: Jul. 12, 1994

[30] Foreign Application Priority Data

Jul. 13, 1993 [DE] Germany .................. 43 23 339.2

[51] Int. Cl.⁶ .................................................. C22B 3/04
[52] U.S. Cl. ..................... 75/744; 209/164; 241/20
[58] Field of Search ............................ 75/733, 710, 672, 75/743, 744; 209/164; 241/20

[56] References Cited

U.S. PATENT DOCUMENTS

| | | | |
|---|---|---|---|
| 3,840,217 | 10/1974 | MacKay | 75/733 |
| 4,325,732 | 4/1982 | Woog | 75/733 |
| 4,331,473 | 5/1982 | King | 75/733 |
| 4,575,392 | 3/1986 | Julliard | 75/672 |
| 4,772,320 | 9/1988 | van Linden | 75/672 |
| 4,880,529 | 11/1989 | Bulatovic et al. | 241/20 |
| 5,004,212 | 4/1991 | Gutierrez | 75/733 |

FOREIGN PATENT DOCUMENTS

| | | |
|---|---|---|
| 109405 | 1/1974 | Germany . |
| 2448935 | 8/1975 | Germany . |
| 2620654 | 12/1976 | Germany . |
| 2827924 | 4/1979 | Germany . |
| 358290 | 8/1980 | Germany . |

OTHER PUBLICATIONS

Kellerwessel, Hans, Aufbereitung disperser Feststoffe, Mineralische Rohstoffe–Sekundärroahstoffe–Abfälle, *VDI VERLAG*, pp. 56–57, Dusseldorf (1991); and *2207B Metallurgical Transactions* 19B (1988) Oct., No. 5, Warrendale, Pa. USA.
Mineralogical Characterization of Silver Flotation Concentrates Made from Zinc Neutral Leach Residues, Chen T. T. et al.

*Primary Examiner*—Melvyn Andrews
*Attorney, Agent, or Firm*—Herbert Dubno

[57] ABSTRACT

In a process for the recovery of silver by flotation from the residue from the wet extraction of zinc, the residue from the neutral wet extraction of zinc, the residue from the neutral wet extraction of zinc is recovered and is subsequently ground in an attritor and the residue which has been ground in an attritor is subjected to a flotation.

3 Claims, No Drawings

PROCESS FOR THE RECOVERY OF SILVER BY FLOATATION FROM THE RESIDUE FROM THE WET EXTRACTION OF ZINC

FIELD OF THE INVENTION

Our present invention relates to a process for the recovery of silver by flotation from the residue of wet extraction of zinc.

BACKGROUND OF THE INVENTION

The residue from the wet extraction of zinc contains silver mainly as $Ag_2S$.

From Metallurgical Transactions B, Vol. 19 B, October 1988-803, it is known that the residues from the neutral wet extraction of zinc which are obtained by Mitsubishi Akita can be subjected to a flotation with AC-404 at a pH from 3.5 to 4.0 to recover 80% of the originally present silver and some gold.

It is also known from that publication that Zhuzhou recovers about 70% of the originally present silver by a flotation under acid conditions with the aid of a collector, which has not been specified.

That publication indicates further that Vieille Montagne has recovered about 90% of the originally present silver and about 75% of the originally present lead in two flotation concentrates by a flotation from residues from the acid wet extraction.

The wet extraction of zinc is usually performed in one or two wet extraction stages. The neutral wet extraction of zinc is usually performed at a slightly acid pH. In many cases the second extraction stage is omitted as uneconomical.

OBJECTS OF THE INVENTION

It is therefore an object of the present invention to provide an improved method of or process for the recovery of silver from the residue from the wet extraction of zinc which is economical and gives a maximum yield of silver.

DESCRIPTION OF THE INVENTION

According to the invention, the residue from the neutral wet extraction of zinc is recovered and is subsequently ground in an attritor and the residue which has been ground in the attritor is subjected to a flotation.

The combination of grinding in the attritor and flotation in accordance with the invention results in a recovery of silver concentrates containing 2 to 2.6 g/kg silver from a residue having a silver content of 0.245 g/kg. The process in accordance with the invention results in a silver yield of >89.5%.

When the residue from the neutral wet extraction of zinc has been ground in the attritor, it has a large surface area. In accordance with the invention the metal values of that residue are separated by flotation. In the attritor the surfaces of the grains appear to be so subjected to attrition that silver-containing crusts present on the surfaces of the grains are detached. The flotation of the residue from the neutral wet extraction of zinc will thus result in higher silver concentrations and a higher silver yield when the residue has previously been ground in an attritor.

For the flotation, the residue which has been ground in an attritor is suspended in water and after the addition of collectors the suspension is conditioned by stirring, whereafter frothing agents are added and air is supplied at a controlled rate.

According to a particularly preferred feature of the invention, the residue from the neutral wet extraction of zinc is treated in a drum which contains grinding media comprising 20 to 30% by volume of grinding media having a particle size <30 mm and which has a net energy input of 2 to 10 kWh per 1000 kg of the throughput.

The attrition performed in accordance with the invention may be performed in a ball mill or vibrating ball mill or by means of attriting stirrers operating primarily by rubbing against the residue. The net energy input to the drum of a given mill is the energy which is transmitted to the shell of the drum, i.e., the energy input to the filled drum minus the energy input to the empty drum, i.e. the energy required to rotate the empty drum. The net energy input is related to the throughput of dry residue.

The grinding in an attritor performed in accordance with the invention enables recovery of silver concentrates which have a particularly high silver content and gives a particularly high yield of silver.

The attrition milling is so carried out, in accordance with a feature of the invention, that the surface area of the grains is increased by 50 to 60% of the residue of the neutral wet extraction of zinc.

Because the residue is ground in accordance with the invention in an attritor, grains having a very large surface area are obtained because the silver-containing crusts are abraded from the surfaces of the grains. The mechanical detaching of the silver-containing crusts results in a particularly high silver yield.

SPECIFIC EXAMPLES

Residues were used which were obtained by the neutral wet extraction of zinc. The material contained 48% by weight water and had a d50 value of 7.9 micrometers (50% of the particles having a particle size of or less than 0.0079 mm) and a d80 value of 19 micrometers (80% of the particles having a particle size of or less than 0.019 mm). The residue contained 0.245 g silver per kg. The most important components of the residue were 3.4% by weight Pb, 19.0% by weight Zn, 1.7% by weight Cu, 26.7% by weight Fe and 4.5% by weight S. The contents of said components in % by weight are based on the dry residue.

The attrition was effected in a ball mill. The net energy input to the drum was of an order of 10 kWh per 1000 kg throughput. During the flotation the pH value was adjusted with $H_2SO_4$. Potassium amyl xanthate was used as a collector in an amount of about 0.6 g/kg. The suspension was conditioned by stirring. A modified pine oil (Hoechst AG) was used as a frothing agent.

As is apparent from the following Table I the residue from the neutral wet extraction of zinc was fine-grained. It is also apparent from Table I that the particle size was not considerably changed by the attriting, however, the surface area of the grains of the residue was increased by 53%.

TABLE I

|  | d80 mm | d50 mm | Specific (Fisher Sub-sieve sizer) Surface area cm$^2$/g |
|---|---|---|---|
| Residue without attrition | 0.019 | 0.0079 | 7470 |
| after attrition | 0.0166 | 0.0076 | 11460 |

The flotation was performed in each case with a slurry which contained 300 g/l solids. A collector was added to the slurry in an amount of 600 g per 1000 kg of solids. Conditioning was effected by stirring for about 5 minutes. Frothing agent was added to the suspension in an amount of 30 g per 1000 kg solids. Air was supplied at a rate of 60 sm$^3$ (sm$^3$=standard cubic meter =m$^3$S.T.P.) per hour and per m$^3$ cell contents. The flotation time was about 7 minutes. During that time air was supplied and the resulting froth was continuously withdrawn.

From the example for a "Flotation After Attrition" reported in the Table it is apparent that the yield of silver in the froth (1) amounted to 89.8% of the silver in the feed. 10.2% of the silver in the feed were measured in the underflow. It is also apparent from the example that the feed contained 245 g silver per 1000 kg. A silver concentration of 2000 g/1000 kg was measured in the froth (1) and a silver concentration of 28g/1000 kg in the underflow (1). In the example the concentration of the silver in the froth (1) was 8.2 times the silver concentration in the feed. But the essential advantage resides in that the yield of silver in the froth (1) amounted to 89.8%.

From the control example "Flotation of Silver Without Preceding Attrition" it is apparent that the amount of silver in the froth (1) was only 16% of the amount of silver in the feed. 84.0% of the silver content of the feed were detected in the underflow (1). It is also apparent from the control example that the feed contained 245 g silver per 1000 kg. The froth (1) had a silver content of 885 g per 1000 kg; this corresponded to an increase of the silver concentration only by a factor of 3.6.

| Flotation After Attrition | | | | | | | | |
|---|---|---|---|---|---|---|---|---|
| | | Metal contents | | | | | | |
| | | % | | | | | | g/1000 kg |
| Product | Wt. % | Pb | Zn | Cu | Fe | As | S | Ag |
| Froth (1) | 11.0 | 2.8 | 26.0 | 2.6 | 22.9 | 0.29 | 9.8 | 2000 |
| Underflow (1) | 89.0 | 3.2 | 18.7 | 1.7 | 27.3 | 0.43 | 4.32 | 28 |
| Froth (2) | 20.9 | 3.6 | 19.0 | 1.7 | 27.8 | 0.40 | 4.4 | — |
| Underflow (2) | 68.1 | 3.5 | 18.6 | 1.7 | 27.2 | 0.40 | 4.3 | — |
| Feed | 100.0 | 3.4 | 19.5 | 1.8 | 26.8 | 0.38 | 4.93 | 245 |

| Flotation After Attrition | | | | | | | |
|---|---|---|---|---|---|---|---|
| | Yield (%) | | | | | | |
| Product | Pb | Zn | Cu % | Fe | As | S | g/1000 kg Ag |
| Froth (1) | 9.0 | 14.7 | 16.0 | 9.3 | 7.9 | 21.9 | 89.8 |
| Underflow (1) | 91.0 | 85.3 | 84.0 | 90.7 | 92.1 | 78.1 | 10.2 |
| Froth (2) | 21.9 | 20.4 | 19.9 | 21.6 | 21.1 | 18.7 | — |
| Underflow (2) | 69.1 | 64.9 | 64.1 | 69.1 | 71.0 | 59.4 | — |
| Feed | 100.0 | 100.0 | 100.0 | 100.0 | 100.0 | 100.0 | 100.0 |

Control Example:

| Flotation Without A Preceding Attrition | | | | | | | | |
|---|---|---|---|---|---|---|---|---|
| | | Metal contents | | | | | | |
| | | % | | | | | | g/1000 kg |
| Product | Wt. % | Pb | Zn | Cu | Fe | As | S | Ag |
| Froth (1) | 4.4 | 2.1 | 34.2 | 1.8 | 18.4 | 0.24 | 16.3 | 885 |
| Underflow (1) | 95.6 | 3.4 | 1.6 | 1.7 | 27.1 | 0.36 | 3.5 | 215 |
| Froth (2) | 16.9 | 6.0 | 7.0 | 3.1 | 24.9 | 0.33 | 6.0 | — |
| Underflow (2) | 78.7 | 2.9 | 19.7 | 1.4 | 27.6 | 0.45 | 3.0 | — |
| Feed | 100.0 | 3.4 | 19.9 | 1.7 | 26.7 | 0.42 | 4.09 | 245 |

| | Yield (%) | | | | | | |
|---|---|---|---|---|---|---|---|
| Product | Pb | Zn | Cu % | Fe | As | S | Ag |
| Froth (1) | 2.7 | 7.5 | 4.7 | 3.0 | 2.4 | 17.6 | 16.0 |
| Underflow (1) | 97.3 | 92.5 | 95.3 | 97.0 | 97.6 | 82.4 | 84.0 |
| Froth (2) | 29.9 | 14.6 | 30.6 | 15.7 | 14.3 | 24.7 | — |
| Underflow (2) | 67.4 | 77.9 | 64.7 | 81.3 | 83.3 | 57.7 | — |
| Feed | 100.0 | 100.0 | 100.0 | 100.0 | 100.0 | 100.0 | 100.0 |

We claim:

1. A process for the recovery of silver, comprising the steps of:

(a) subjecting a particulate solids material containing zinc and silver to a neutral wet extraction of zinc and recovering a silver-containing residue from said extraction;

(b) subjecting said silver-containing residue to attrition in a rotating drum containing a particulate grinding medium, said drum having a net energy input of 2 to 10 kWh per 1000 kg of a throughput of said drum, and in said drum rubbing silver-containing particles from the particles of said residue; and (c) separating silver-containing particles from said residue subjected to attrition according to step (b) by flotation.

2. The process according to claim 1 wherein in step (b) the silver-containing residue is subjected to attrition in a rotating drum which contains 20 to 30% by volume of a particulate grinding medium having a particle size of <30 mm.

3. The process according to claim 1 wherein in step (b) grinding of the residue in the attritor is so carried out that the surface area of the grains is increased by 50 to 60%.

* * * * *